United States Patent Office 2,727,047
Patented Dec. 13, 1955

2,727,047

METHOD OF STABILIZING COLOR OF DEHYDRATED CASTOR OIL

James V. Hunn, Avon Lake, Ohio, assignor to The Sherwin-Williams Company, Cleveland, Ohio, a corporation of Ohio No Drawing. Application October 29, 1952,
Serial No. 317,580

14 Claims. (Cl. 260—405.5)

This invention relates to the method of stabilizing the color of catalytically dehydrated castor oil.

Castor oil, a non-drying oil, is converted to a drying oil, for use in the coatings industry, by a process known as dehydration. Dehydration consists of the removal of a hydroxyl group and one adjacent hydrogen in the form of water, thereby creating an additional double bond and imparting drying properties to the oil. The usual method of dehydrating raw castor oil is accomplished by catalytic means, employing such acid catalysts as diethyl sulphate, sodium bisulphate, phosphoric acid, etc. Unfortunately, with the use of such acid catalysts in the dehydration process, residual traces of the mineral acid always remain. These traces of mineral acid cause an increase in color rating upon cooling of the dehydrated castor oil. The dehydrated castor oil, after cooling and in storage, continues to lose color and becomes darker depending on the length of time in storage. The maintenance of light color is vitally important where the dehydrated castor oil is to be subsequently used in alkyd formation. The catalyst used in catalytic dehydration of castor oil for the most part are acids or acid salts which upon heating at the dehydration temperatures decompose to various acid complexes. It is felt that acid complexes formed with the oil during dehydration cause the darkening of the dehydrated oil.

While other drying oils or semi-drying oils used in the paint industry such as linseed, soya, etc. may be water washed to remove color producing treating agents, it is impractical to wash dehydrated castor oil with water because an emulsion is formed as soon as water and dehydrated castor oil are mixed. Dehydrated castor oil usually contains from about 1 to 3% of fatty acids, and it is apparent that materials which tend to form water soluble soaps cannot be added.

Therefore it is a principal object of this invention to provide a method whereby dehydrated castor oil is color stabilized at the color level existing at the last stage of dehydration.

Another object of this invention is to provide a method of stabilizing the color of dehydrated castor oil after it has cooled off and is in storage.

A further object of this invention is to provide a method of stabilizing the color of dehydrated castor oil so that the oil retains its light color in subsequent use.

Still further, an object of this invention is to provide a method whereby the acid value of dehydrated castor oil is lowered.

Other objects of this invention appear as the description proceeds.

To the accomplishment of the foregoing and related ends, said invention, then, consists of the means hereinafter fully described and particularly pointed out in the appended claims, the following description setting forth in detail certain illustrative embodiments of the invention, such disclosed means constituting, however, but a few of the various forms in which the principle of this invention may be employed.

It has been found that any salt or soap of an alkaline earth metal, aluminum or zinc, or mixtures thereof having an acid radicle which is weaker than that of the acid used as a dehydration catalyst may be used as an additive to dehydrated castor oil catalytically produced either by the batch or continuous dehydration process, and in this way, the dehydrated castor oil will retain substantially the color present at the time of the addition of such salts. Such salts and soaps may be classed as relatively basic materials when compared to the acids used as catalysts in the dehydration process.

Broadly stated, then, this invention comprises a method of stabilizing the color of catalytically dehydrated castor oil comprising adding to said catalytically dehydrated castor oil a minor amount of a relatively basic material having the general formula:

$$M-X$$

wherein M is a metal selected from the group consisting of the alkaline earth metals, aluminum and zinc, and X is a radicle selected from the group consisting of oxide, hydroxide, carbonate, and organic acid radicles weaker than that of the acid used as the dehydration catalyst. More specifically stated, this invention comprises the method of stabilizing the color of catalytically dehydrated castor oil comprising adding to said catalytically dehydrated castor oil at a temperature of from about 500 to 550° F. from about .02 to .04% by weight calculated as metal and based on the weight of the oil to be treated of an alkaline earth metal soap, said soap having an acid radicle weaker than that of the acid used as a dehydration catalyst.

The metal cations of the salts employed in the practice of this invention are the alkaline earth metals, aluminum and zinc. Magnesium, barium, calcium and zinc are preferred in the order listed.

The radicles used in forming the salts or soaps useful in the practice of this invention are those which form salts or soaps with the aforementioned metals that are colorless, such as oxides, hydroxides, carbonates, acetates, methylates, octoates, oleates, linoleates, sunflower fatty acids, soya fatty acids, and the fatty acids of dehydrated castor oil. When fatty acids are used to form the salts and soaps, such fatty acids may be mixed, for example, dehydrated castor oil, sunflower fatty acids, linoleic fatty acids, etc. and used together. It has also been found impractical to use salts or soaps that have too low solubility in the dehydrated castor oil, as such products produce a hazy and therefore usually undesirable oil, that cannot be brightened by tedious filtration. Such salts or soaps that are usually not color-stable are also undesirable as they prove detrimental in the subsequent usage of the dehydrated castor oil, as for example, in the formation of alkyds where good color stability is of paramount importance. Salts of naphthenic acid are good examples of this point because such salts or soaps are usually dark in color and discolor on aging.

The acetates, carbonates and hydroxide compounds are added to the dehydrated castor oil usually by grinding into a slurry with water or previously dehydrated castor oil. Since these compounds are not entirely soluble in dehydrated castor oil, the so-treated dehydrated castor oil must then be filtered to remove the excess of these compounds still in suspension. This of necessity results in a slight loss of the dehydrated castor oil so treated.

The salts or soaps of fatty acids when added to dehydrated castor oil as taught by this invention may be dissolved either in previously dehydrated castor oil or in solvents. For the purposes of this invention it is preferred to add such salts or soaps of fatty acids to the dehydrated castor oil in solvents. It is desirable that such solvents used have a boiling point about the same as that of the temperature of the heat of the dehydration reaction. Thus, the solvents distill off and leave the salt or soap within the dehydrated castor oil. These solvents may be either aliphatic or aromatic. However, the solvents in the kerosene range are preferred because of cheapness, availability, flash point, etc. It has further been noticed that when solvents are used as carriers for the salts or soaps, the boiling and bubbling off of the solvents seems to carry off some of the decomposition products of the dehydration process and there is a consequent lowering of the acid value of the dehydrated castor oil.

When solvents are employed, it is best to have the equipment under evacuated conditions and employ an inert atmosphere, such as are present in dehydration. When using a slurry of the acetates or carbonates in dehydrated castor oil, it is not actually necessary to use a vacuum or inert atmosphere. However, for most purposes it is preferred to do so.

The salts or soaps employed in the practice of this invention may be added to the hot dehydrated castor oil or to dehydrated castor oil that has been allowed to cool. Although addition of the salts or soaps at room temperatures will effect some color stabilization, it is preferred to add these compounds while the dehydrated castor oil is still at the temperature prevailing during the final step of dehydration. In this event, the dehydrated castor oil retains its light color, usually 3 G–H, even after cooling and allowed to stand for considerable time in storage. When the salts or soaps are added to dehydrated castor oil which has been allowed to cool, such treated dehydrated castor oil retains the color prevailing at the time of the addition of the compounds. It has been found that dehydrated castor oil, whether treated while hot or after having been allowed to cool, retains its light color in storage.

The temperature range employed in the practice of this invention is that prevailing during the final step of dehydration, being from about 400 to 600° F. It is preferred to use the heat which has been derived solely from the heat content obtaining in the course of the dehydration reaction.

The amount of soap or salt added to treat the dehydrated castor oil is usually determined experimentally. However, the amount must be sufficient to neutralize the traces of residual acid catalyst present. This depends upon such things as the temperature prevailing, the length of cook, the amount and kind of catalyst employed. It is to be noted that a small excess of salt or soap is not detrimental to the so-treated dehydrated castor oil. It might be said, then, that an excess is advisable. The general range is usually from about .01 to .1% by weight calculated as metal and based on the entire weight of the dehydrated castor oil. A preferred range is from about .02 to about .04% by weight calculated as metal and based on the entire weight of the dehydrated castor oil.

The salts and soaps employed in the practice of this invention are prepared in the normal manner well known to those skilled in the art. It is only necessary to use compounds which have been formed in such a way as to be stabilized and not form gels upon further handling.

Following are examples of the details of the methods employed in my invention and it will be understood that my invention is not limited to the specific conditions described nor to the specific materials used in the examples:

In general, the color of the light viscosity dehydrated castor oil will vary depending upon the conditions under which it is prepared. Consequently in the following examples, the increase in color is compared to that of untreated dehydrated oil prepared under similar conditions of time, temperature, amount of catalyst employed and the rate at which it is introduced, and the subatmospheric pressures at which dehydration was carried out.

Table I

| Example | Color Stabilizing Material | Vehicle for Introducing In— | Percent Metal Based on Dehydrated Castor Oil |
|---|---|---|---|
| I | Magnesium Carbonate | None | [1] 0.02 |
| II | Calcium Carbonate | do | [1] 0.02 |
| III | Magnesium Acetate | Dehydrated Castor Oil | 0.02 |
| IV | do | Water | 0.02 |
| V | Magnesium Methylate | Soya oil and alcohol | 0.02 |
| VI | Magnesium Naphthenate | Naphthenic acid | 0.02 |
| VII | Magnesium Octoate | Dehydrated Castor Oil | 0.02 |
| VIII | Zinc Octoate | do | 0.02 |
| IX | Calcium Octoate | Mineral Spirits | 0.02 |
| X | Magnesium Octoate | do | 0.02 |

[1] Insoluble precipitate must be filtered out.

Dehydrated castor oil discolors rapidly at elevated temperatures, and equivalent discoloration will occur in 24 hours at 200° F. to several months of storage. The results of such tests are tabulated below:

Table II

| Example | Gardner-Holdt Ratings DCO Without Color Stabilizer | | Accelerated Heat Test DCO With Color Stabilizer | |
|---|---|---|---|---|
|  | Initial Color | After 24 hrs. | Initial Color | After hrs. |
| I | 4–5 | 6– | 5–6 | 6– |
| II | 4–5 | 6– | 5+ | 5+ |
| III | 3–4 | 5 | 3–4 | 4 |
| IV | 3¼ | 5 | 3¼ | 4 |
| V | 5– | 6– | 5– | 5 |
| VI | 5– | 6– | 5– | 5+ |
| VII | 3–4 | 4+ | 4– | 4+ |
| VIII | 3–4 | 7 | 3–4 | 6–7 |
| IX | 2¼ | 3¼ | 2 | 2¼ |
| X | 2¼ | 3¼ | 2 | 2¼ |

Table III

| | DCO Without Color Stabilizer | | DCO With Color Stabilizer | | DCO Storage at Room Temperature 150 days | |
|---|---|---|---|---|---|---|
| | Initial Color | After 96 hrs. | Initial Color | After 96 hrs. | Without Stabilizer | With Stabilizer |
| Ex. X, .02% metal | 2½ | 4½ | 2½ | 3¼ | 3¼ | 1.0 |
| Ex. X, .03% metal | 2½ | 4½ | 2½ | 3¾ | 3¼ | 1.0 |
| Ex. X, .04% metal | 2½ | 4½ | 2¾ | 3¾ | 3¼ | 2¼ |

It will be noted in the foregoing table that upon storage at room temperature, the oil containing the stabilizer bleached to some extent and was considerably lighter in color than similar oils when subjected to the heat test. The unstabilized oil or blank increased in color both in storage at room temperature and under the heat test. Also, the degree of bleach steadily decreases as the amount of magnesium octoate is increased. This indicates that the amount that can be added has an upper limit.

The method of this invention may be used to treat castor oil, catalytically dehydrated either by batch or continuous process. The compounds used as additives, as taught by the method of my invention, may be added directly to the hot dehydrated castor oil, and the dehydrated castor oil is held for a short period or approximately an additional 10 minutes at the reaction temperatures. Agitation upon the addition of these compounds is not always necessary, particularly when a volatile vehicle for the compound is used. However, the compounds must be thoroughly mixed throughout the dehydrated castor oil as the oil is being finally treated. In the case of the compounds added in solvents, the solvents flash off, causing violent agitation, thereby automatically mixing in the compounds with the dehydrated castor oil. The reacted product is cooled under the reduced pressure conditions of dehydration to room temperature as rapidly as possible. Dehydrated castor oil treated as taught by my invention appears to retain color almost indefinitely.

Other modes of applying the principle of this invention may be employed instead of those specifically set forth above, changes being made as regards the details herein disclosed, provided the elements set forth in any of the following claims, or the equivalent of such be employed.

I, therefore, particularly point out and distinctly claim as my invention:

1. The method of stabilizing the color of catalytically dehydrated castor oil, said dehydration being effected by means of an acidic catalyst, comprising adding to said catalytically dehydrated castor oil a minor amount of a relatively basic material having the general formula:

$$M\text{---}X$$

wherein M is a metal selected from the group consisting of the alkaline earth metals, aluminum and zinc, and X is a radicle selected from the group consisting of oxide, hydroxide, carbonate, and organic acid radicles weaker than that of the acid used as the dehydration catalyst at a temperature no less than about 400° F., said temperature level being derived solely from the heat content obtaining in the course of the dehydration reaction.

2. The method of claim 1, in which said relatively basic material is added from about .01 to .1% by weight of the metal based on the entire weight of the oil so treated.

3. The method of claim 1, in which said relatively basic material is added from about .02 to .04% by weight of the metal based on the entire weight of the oil so treated.

4. The method of claim 1 in which the temperature is from about 400 to 600° F.

5. The method of claim 1 in which the temperature is from about 500 to 550° F.

6. The method of claim 1 in which the metal used is selected from the group of alkaline earth metals.

7. The method of claim 1 in which the metal is aluminum.

8. The method of claim 1 in which the metal is zinc.

9. The method of claim 1 in which X is a carbonate.

10. The method of claim 1 in which the relatively basic material is magnesium carbonate.

11. The method of claim 1 in which the relatively basic material is magnesium acetate.

12. The method of stabilizing the color of catalytically dehydrated castor oil, said dehydration being effected by means of an acidic catalyst, comprising adding to said catalytically dehydrated castor oil from about .02 to .04% by weight of the metal based on the entire weight of the oil to be treated of an alkaline earth metal salt, said salt having an acid radicle weaker than that of the acid used as the dehydration catalyst, at from about 500 to 550° F.

13. The method of claim 1 in which the relatively basic material is magnesium octoate.

14. The method of claim 12 in which the alkaline earth metal salt is magnesium octoate.

References Cited in the file of this patent

Paint Manufacture, August 1941, pages 166–170.